United States Patent Office 3,804,955
Patented Apr. 16, 1974

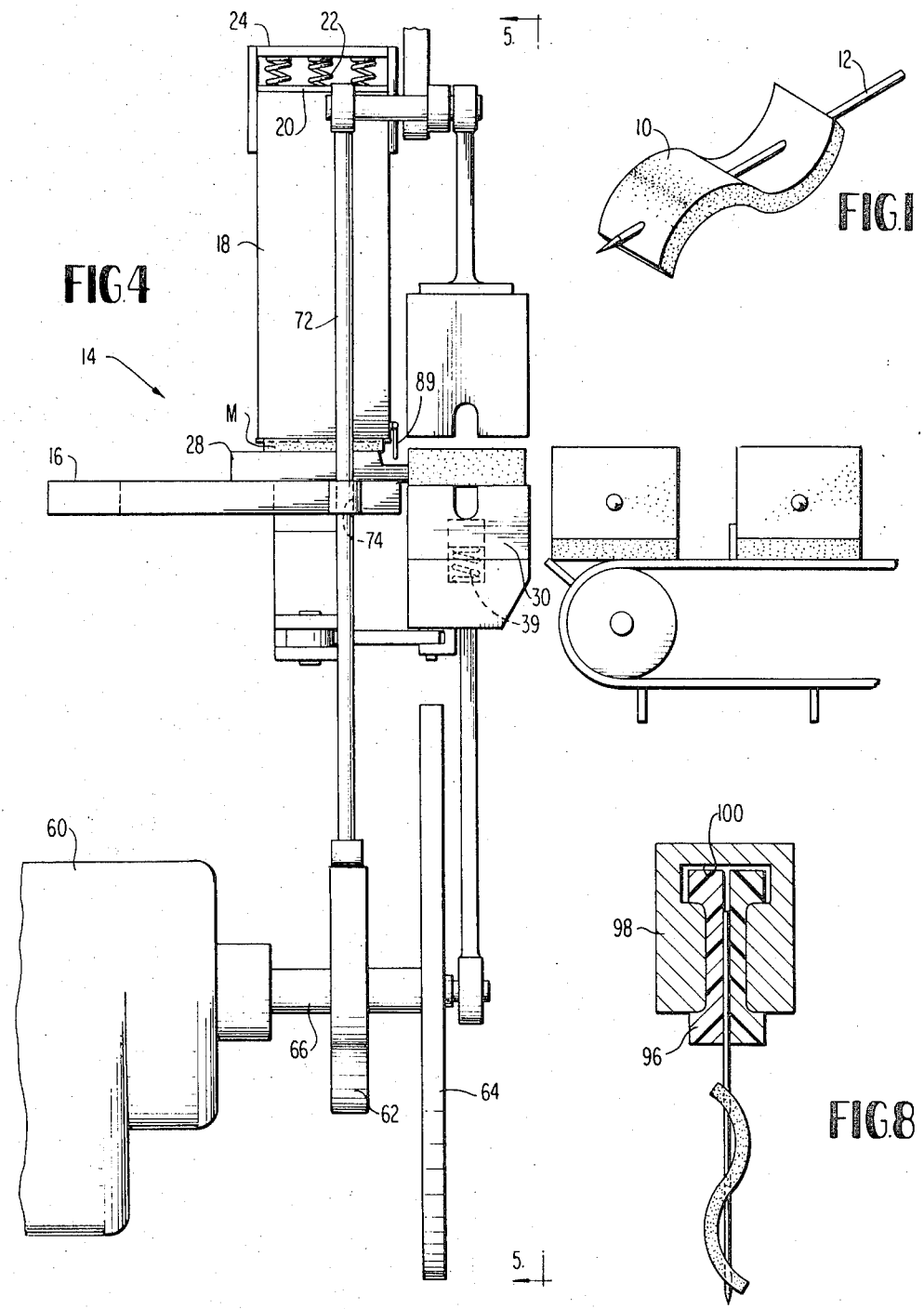

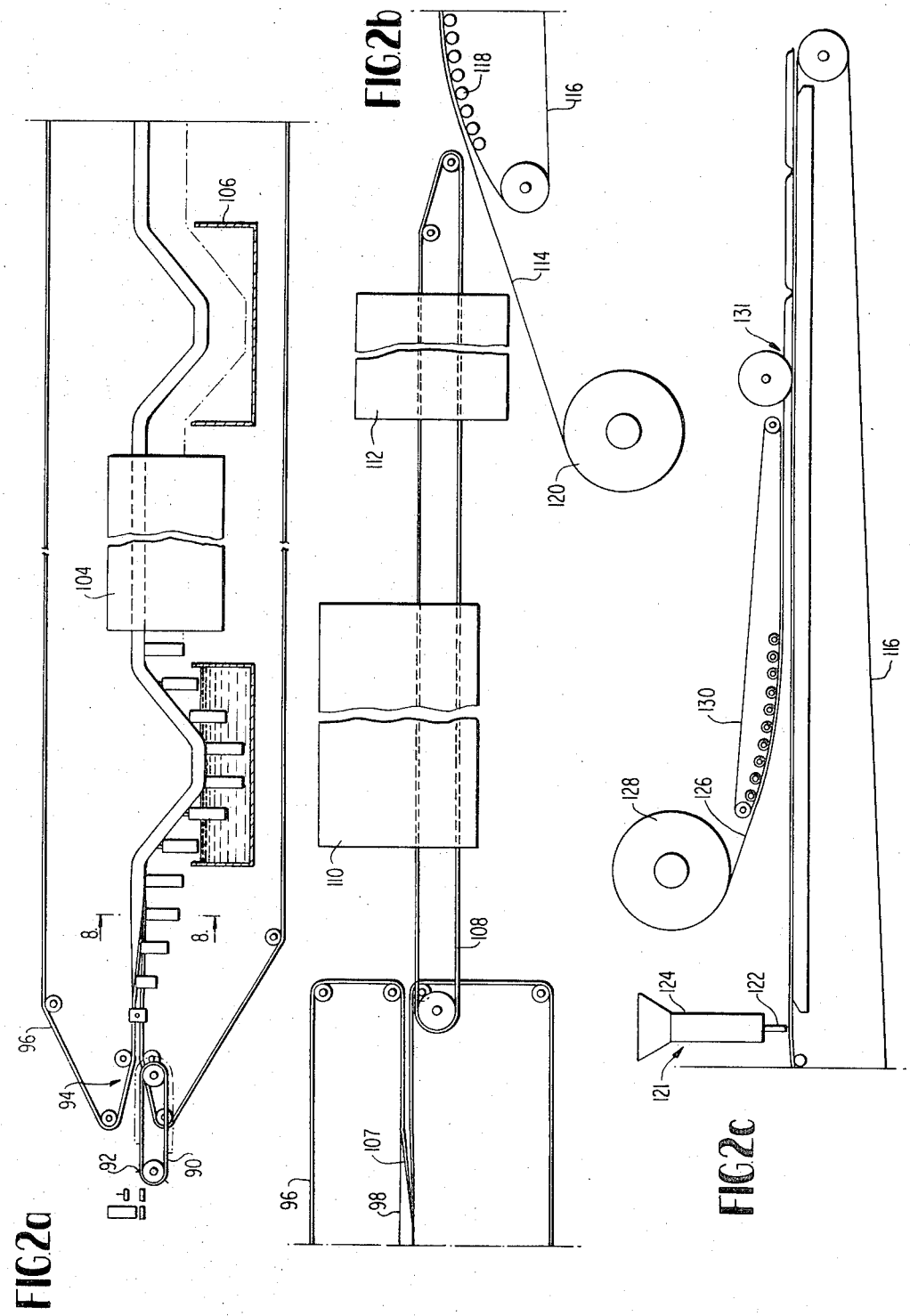

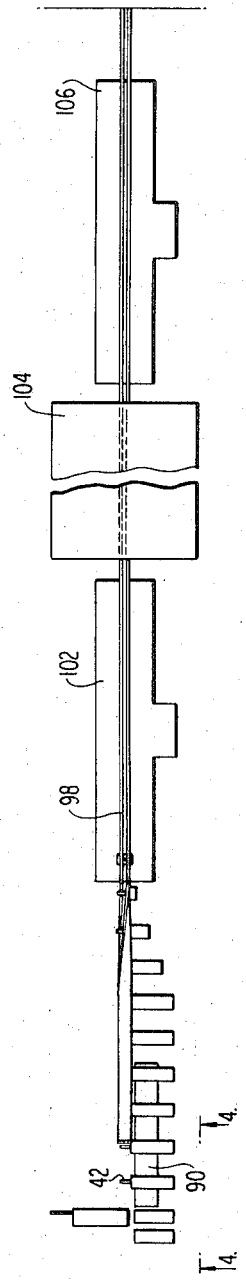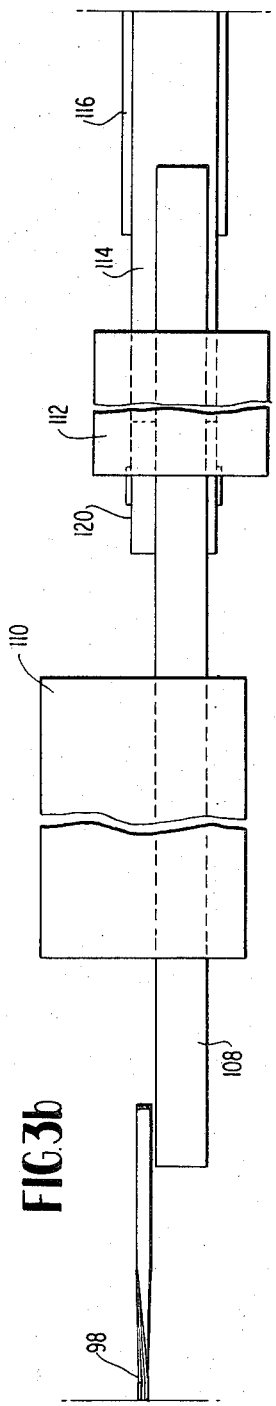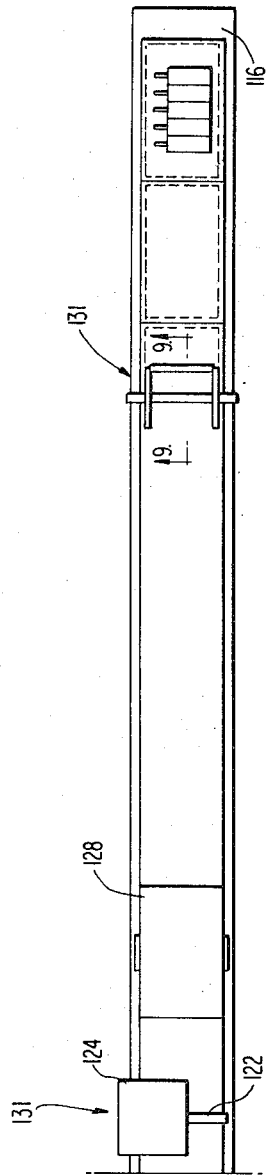

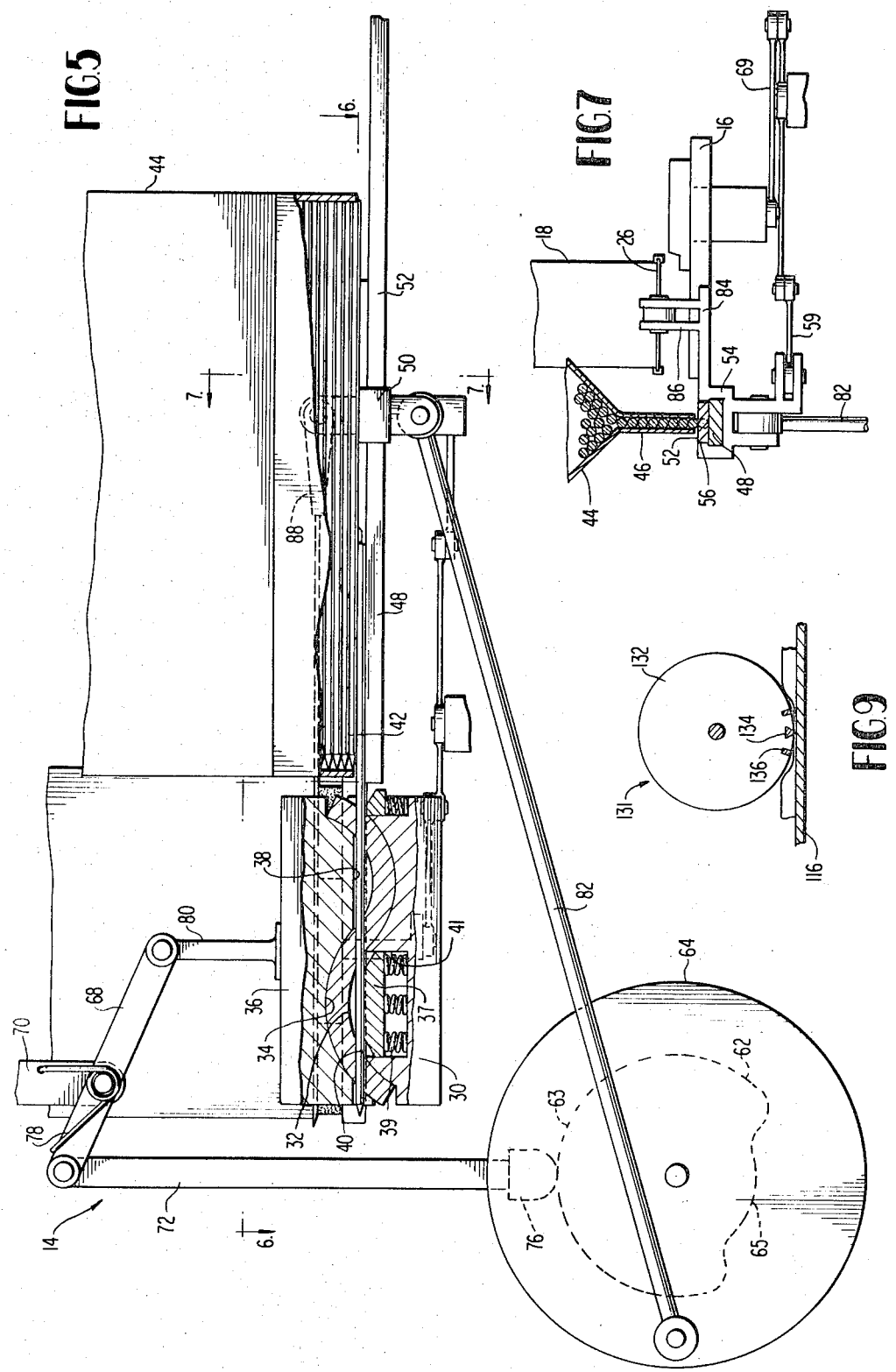

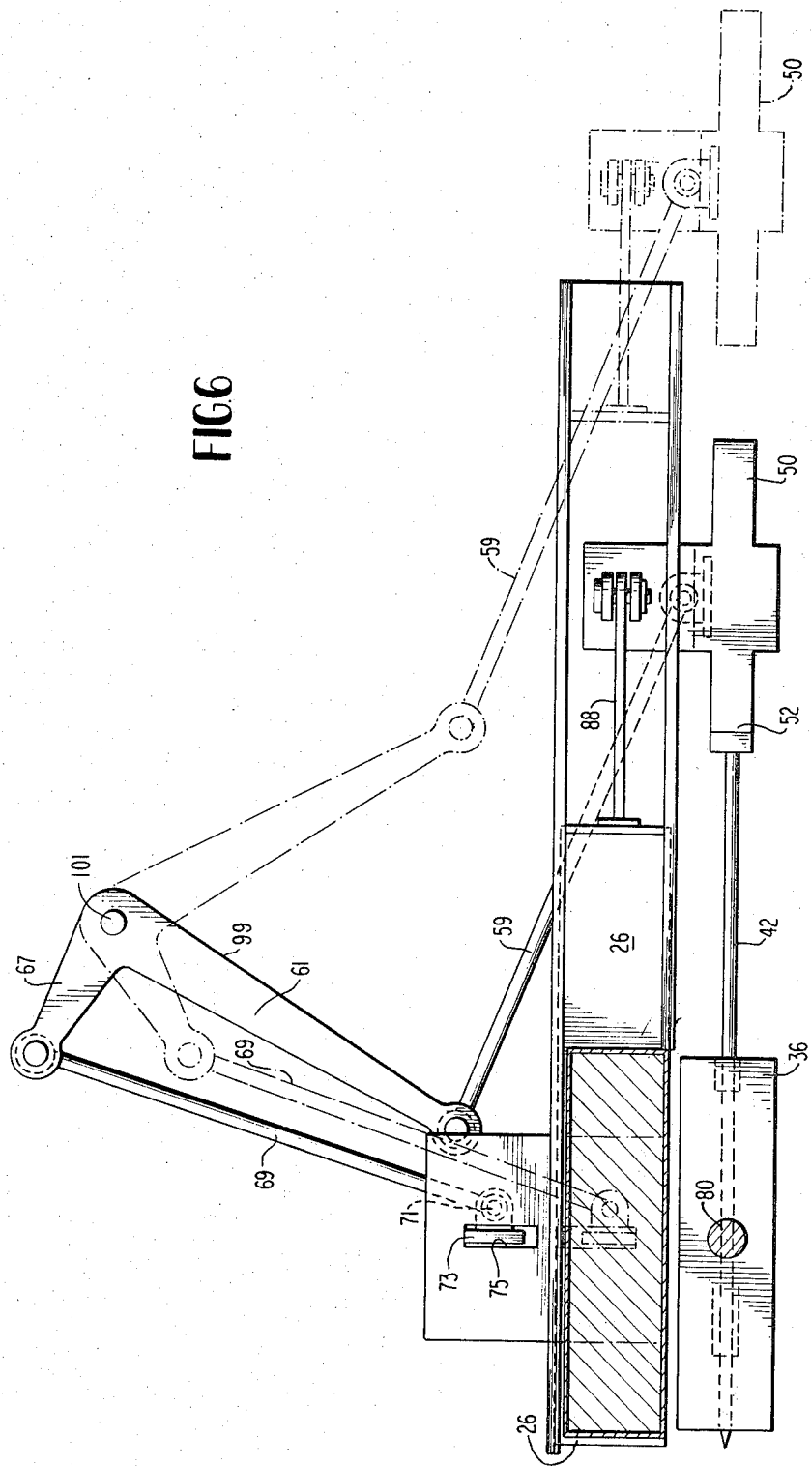

3,804,955
AN AUTOMATED METHOD FOR PREPARING PACKAGED SKEWERED MEAT PRODUCTS
Philip Y. Chow, 3 Harran Circle, Orinda, Calif. 94563
Original application Sept. 15, 1971, Ser. No. 180,670. Divided and this application Oct. 2, 1972, Ser. No. 293,836
Int. Cl. A22c 18/00
U.S. Cl. 426—302
3 Claims

ABSTRACT OF THE DISCLOSURE

The food is sliced into strips and disposed between a pair of corrugated platens. The platens, when closed, have registering guide slots through their complementary corrugated faces for receiving a skewer. The skewer is inserted through the openings and a food strip between the platens while a blade cuts the next food strip. The skewered food is picked up and conveyed through a sauce bath, a dryer, an oil bath and through an oven. From the oven, the individual skewered food products are grouped and packaged with a prepackaged sauce container.

---

This is a division of application Ser. No. 180,670, filed Sept. 15, 1971, now Pat. 3,729,774.

The present invention relates to apparatus and methods for preparing and processing food products and particularly relates to apparatus and methods for preparing and packaging skewered meat slices.

Many popular foods, for example, shiskebab, satay kambing madura (mutton satay), satay daging (beef satay), satay ayam (chicken satay), etc., are pierced with a skewer prior to or after cooking, and are very often served on the skewer. Conventionally, this operation is performed manually. The worker normally holds the food to be skewered in one hand and pierces it with a skewer. As will be appreciated, this is a time consuming, laborious, and uneconomical method of disposing the food products on a skewer. Moreover, these manual preparations are, to some extent, unsanitary and do not lend themselves to the mass production of skewered food products.

Automatic skewering machines have been proposed in the past. One such machine is disclosed in U.S. Pat. No. 2,815,530. In that machine, a pair of corrugated platens are provided. The upper platen is pivoted between open and closed positions relative to the lower platen. When in the closed position with a strip of food disposed between the platens, the food strip obtains a generally sinuous pattern. To insert skewers into the platens, aligned openings through the corrugarted portions of the platens are provided. The skewers are then inserted through the aligned openings and pierce the sinuously configured food. Upon raising the upper platen, the skewered food can be removed from the machine. This process, however, still requires certain manual steps, for example, the location of the food between the platens, as well as manual insertion of the skewers through the platen and food. This machine would appear unsatisfactory for mass production of skewered food products.

Another food skewering machine is described and illustrated in U.S. Pat. No. 3,405,422. In that patent, there is disclosed a plurality of chambers in which the food products are disposed. A skewer storage chamber feeds a plurality of skewers into position longitudinally adjacent the chambers in which the food is disposed. A motorized unit then actuates a plurality of push rods which engage the skewers and push the latter through the food products in the chambers. While this machine is to some extent automated, it is quite apparent that it cannot function to skewer sinuous strips of meat without extensive manual labor.

The present invention minimizes or eliminates the problems associated with prior manual and semi-automated machines for skewering food products, and provides a novel automated food processing machine and method for preparing skewered food products and which machine and method have various advantages in construction, mode of operation and result in comparison with prior apparatus and methods for skewering food products. To this end, the present invention includes a food cutting and skewering station under control of a motorized unit. At this station, the food is cut into slices and transferred onto a lower platen. An upper platen is movable toward and away from the lower platen, each platen having corresponding corrugated faces which, when pressed toward one another, form food slices in a generally sinuous configuration. The platens, when closed, have aligned registering slots through their corrugated faces for receiving skewers from a storage chamber. The lower platen also has a pair of spring-loaded plates. When a food slice is disposed between the press platens, the motorized unit is actuated to lower the upper platen thereby to press the food slice against the bias of the spring-loaded plates and into a generally sinuous form. The motorized unit also causes a skewer to be inserted through the aligned slots and lengthwise through the sinuously configured food slice. Simultaneously, the next food product to be skewered is sliced into a strip. Upon completion of the skewering operation and spacing the platens one from the other, the spring-biased plates return to their normal positions raising the skewered slice from the lower press platen. The motorized unit then causes the newly cut strip to move between the press platens displacing the skewered food product onto a first conveyor.

A second conveyor grips the skewer and displaces the skewered food slice from a generally horizontal orientation on the first conveyor to a vertical orientatation. The second conveyor then conveys the skewered slice in succession through a sauce bath, a dryer, and an oil bath. The vertically arranged skewered slices are then returned to a horizontal position and disposed on a third conveyor for conveyance through an oven. After the skewered food products are cooked, they are deposited on a moving sheet of packaging material, such as polyethelene plastic. As the packaging sheet moves along, the skewered food slices are accumulated in groups of a predetermined number each by a vertically reciprocable gate. A sauce package is dropped from a dispenser and disposed with each group of skewered food slices. The groups of skewered slices and sauce packages are conveyed by the packaging sheet below a second sheet of packaging material. The packaging materials are sealed one to the other and cut to form individually packaged groups of skewered food products.

Accordingly, it is a primary object of the present invention to provide novel and improved apparatus and methods for preparing skewered food products.

It is another object of the present invention to provide novel and improved apparatus and methods for producing skewered food products in a manner which requires only nominal manual labor and in which substantially the entirety of the process is automated.

It is still another object of the present invention to provide a novel and improved automated food skewering apparatus.

These and further objects and advantages of the present invention will become more apparent upon reference to the following specification, claims and appended drawings wherein:

FIG. 1 is a perspective view of a meat product skewered by the apparatus and methods of the present invention;

FIGS. 2a, 2b and 2c are schematic side elevational views of a meat preparation process according to the present invention;

FIGS. 3a, 3b and 3c are schematic plan views corresponding to FIGS. 2a, 2b and 2c, respectively;

FIG. 4 is a side elevational view of a meat preparation station and which station forms an initial portion of the process of the present invention, this view being taken generally about on line 4—4 in FIG. 3a;

FIG. 5 is a fragmentary cross sectional view thereof taken generally about on line 5—5 in FIG. 4;

FIG. 6 is a cross sectional view thereof taken about on line 6—6 in FIG. 5 and illustrating two positions of the cross slider and skewer pusher assembly;

FIG. 7 is a cross sectional view thereof taken about on line 7—7 in FIG. 5;

FIG. 8 is an enlarged cross sectional view of a portion of the conveying apparatus taken generally about on line 8—8 in FIG. 2a; and FIG. 9 is an enlarged cross sectional view of the cutting and packaging apparatus of the present invention taken generally about on line 9—9 in FIG. 3c.

The present invention is described with particular reference to skewering meat for preparing satay in packaged form with a skewer stick through the meat. It will however, be appreciated that other types of food products can be prepared utilizing the apparatus and methods of the present invention.

The finished skewered meat product is diagrammatically illustrated in FIG. 1 and includes a strip or slice of meat 10 in a generally S shaped or sinuous configuration with a skewer stick 12 disposed through each of the adjacent arcuately reversed portions of the meat. To provide meat products in the form of skewered strips as illustrated in FIG. 1, the present invention provides an automated meat preparation station, generally indicated 14 in FIGS. 4 and 5, which station constitutes the initial step in the preparation of a cooked, packaged and skewered meat product according to the present invention. Meat preparation station 14 includes a table 16 above which is disposed a magazine 18 comprised of a container for unsliced meat. Container 18 has a generally rectangular cross section and is open at its lower end. The upper end of container 18 is closed by a plate 20. Plate 20 is biased downwardly by a plurality of springs 22 fixed to a framework 24 to which the container 18 is suitably mounted. It will be appreciated that the meat in container 18 is thus pressed downwardly onto table 16 by pusher plate 20 and springs 22.

On one side of magazine 18, there is provided a blade 26 which reciprocates back and forth across the lower open end of magazine 18 whereby the meat pressed onto the table at the lower end of magazine 18 is sliced into thin horizontally disposed strips M. A cross slider 28 is carried on table 16 for reciprocating movement in a direction at right angles to the direction of the reciprocating movement of blade 26. Cross slider 28 serves to displace the sliced strip of meat from below the meat magazine onto a lower platen 30 on which platen the meat is skewered in a manner to be described. It will be appreciated that the slab or block of meat in container 18 is thus first sliced by blade 26, with cross slider 28 operable to then push the sliced meat from the table 16 onto the lower platen 30 after blade 26 has been withdrawn laterally from its slicing position.

Referring to FIG. 5, skewers are disposed on the same side of table 16 as blade 26 and, by mechanism to be described, are inserted into the sliced meat on the platen 30. The cooperation between the skewering apparatus, slicing apparatus and cross slider including the timing therefor is described hereinafter. Referring to FIG. 5, it will be seen that lower platen 30 has a sinuous or corrugated upper surface 32. A corresponding sinuous or corrugated face 34 is provided on a vertically reciprocable upper platen 36. The upper and lower platens are each provided with horizontally extending guide slots 38 and 40, respectively, which open through faces 34 and 32. Lower platen 30 also has a pair of vertically movable plates 37 carried by springs 39 and which springs normally locate the plates 37 above the corrugated face of the lower platen. The plates and springs are located in recesses 41 in the upper face of lower platen 30. When the upper platen is lowered into the position illustrated in FIG. 5, the sliced meat disposed between platens 30 and 36 is pressed into the desired sinuous form with the plates 37 being displaced into recesses 41 against the bias of springs 39. Also, guide slots 38 and 40 are aligned longitudinally one with the other for receiving a skewer stick 42.

Skewer sticks 42 are stored in a magazine 44 which is generally funnel-shaped in cross section as illustrated in FIG. 7 and terminates at its lower end in a vertically disposed discharge chute 46. Discharge chute 46 is slightly greater in width than the diameter of the individual skewer sticks 42. The skewer sticks 42 are thus vertically aligned one on top of the other in discharge chute 46. An elongated frame 48 is disposed in spaced relation below discharge chute 46 a distance slightly greater than the diameter of the individual skewer stick 42. The elongated frame 48 may have a slight arcuate groove in its upper surface to serve as a guide for the skewer stick as it is pushed toward the press platens through the meat slice. A skewer stick pusher assembly 50 is provided and includes a pusher bar 52 on the extreme right hand side of the skewer magazine 44 as illustrated in FIG. 5. Bar 52 is longitudinally reciprocable toward and away from the platens and from a retracted position. Assembly 50 also includes a generally channel-shaped slider 54 having inturned flanges 56 (FIG. 7) for sliding movement along frame 48. It will be appreciated that, when pusher bar 52 lies in a retracted position to one side of magazine 44, the skewer stick rests on frame 48 in the arcuate groove thereof. Upon movement of slider 54 toward the platens, pusher bar 52 engages the end of a skewer stick 42 and moves it along frame 48 through the sinuously shaped meat slice and through the aligned guide slots 38 and 40 in the upper and lower press platens 36 and 30, respectively. Upon retraction of slider 54, the next skewer stick 42 drops from chute 46 in position ready for insertion through the next meat slice.

To coordinate the operation of meat slicer 26, cross slider 28, upper platen 36 and skewer pusher assembly 50, a series of links, cams and bellcranks are provided. Particularly, and referring to FIGS. 4 and 5, there is provided a motor 60 mounting a cam 62 and a crank 64 on its output shaft 66. As illustrated in FIG. 5, the cam 62 has a generally circular cam surface 63 and a relieved portion 65 of smaller radius which extends circumferentially for substantially about a quadrant. A lever 68 is pivotally carried by a frame member 70 and, at one end, pivotally carries a rod 72. Rod 72 extends through a guide opening 74 in table 16 and terminates at its lower end in a cam follower 76 engageable with cam surfaces 63 and 65. A spring 78 biases 68 for movement in a counterclockwise direction as illustrated in FIG. 5 whereby cam follower 76 is maintained in continuous engagement with cam surfaces 63 and 65. The opposite end of lever 68 is pivotally connected to a rod 80 carrying upper platen 36. It will be appreciated that as the cam 62 rotates, the upper platen 36 moves between raised and lowered positions when the cam follower 76 engages the reduced cam surface 65 and cam surface 63, respectively.

Crank 64 operates a piston rod 82 which is directly connected to the skewer pusher assembly 50. Pusher assembly 50 includes an arm 84 having a pair of upwardly projecting ears 86 pivotally mounting a pin 88 mounting cutting blade 26. As crank 64 and cam 62 rotate, upper platen 36 is moved toward lower platen 30 to press the sliced meat into the sinuous configuration just prior to movement of the skewer pusher assembly 50 toward the upper and lower press platens. As the upper platen 36 is maintained in pressing position against the meat slice and lower platen 30 by interaction of cam follower 76 on outer cam surface 63 and lever 68, the pusher assembly 50 and blade 26 move toward the platens to respectively insert the skewer stick 42 into the meat slice and through the aligned slots of the platens, and to cut the next slice of meat from the meat slab within magazine 18. Also connected with the skewer pusher assembly 50 is a series of links and a bellcrank for operating the cross slider. The cross slider, of course, serves to displace the sliced meat from below the magazine and on table 16 onto the lower press platen 30 simultaneously displacing the skewered meat slice from the lower press platen onto a conveyor 90 after the upper platen has raised and springs 39 have elevated the skewered meat slice from the lower platen.

The skewer pusher assembly 50 also pivotally carries a rod 59 (FIG. 6) which at its opposite end is pivotally connected to the distal end of the leg 61 of a bellcrank 99 which is pivotally mounted at 101 to fixed frame 70. The short leg 67 of bellcrank 99 is pivotally connected to one end of a rod 69, the opposite end of which is pivotally connected at 71 to a pin 73 which rides in a track formed in table 16. Pin 73 extends upwardly into a slot 75 in cross slider 28, the slot 75 being slightly longer in length than the length of pin 73. From FIG. 6, it will be appreciated that with the pusher assembly 50 located in its extreme advanced position, the rods 59, 69 and bellcrank 99 cooperate to locate the cross slider 28 in a retracted position with pin 73 in the rearmost portion of slot 75 as illustrated in the full line positions thereof. Upon retraction of the skewer pusher assembly 50, the rods 59, 69 and bellcrank 99 initially advance the pin 73 in slot 75 without any corresponding movement of the cross slider 28. This time delay is sufficient for the upper platen 36 to be elevated a distance such that springs 39 elevate the plates 37 and hence the skewered meat slice above the face of lower platen 30. Continued retraction of the pusher assembly 50 causes pins 73 to engage in a forwardmost position of slot 75 and thereby advance the cross slider 28 toward the platens. That is, the cross slider 28 engages the meat slice below the meat magazine at an elevation below the cutting blade 26 and displaces it into position for skewering onto the lower platen 30 while simultaneously displacing the skewered meat slice from plates 37 onto conveyor 90. As illustrated in FIG. 4, a meat return stop preventor comprising a pivoted flap 89 is carried by magazine 18. Flap 89 precludes return of the slice onto table 16 from the lower platen in response to retracting movement of the cross slider 28.

Referring to FIGS. 2a–2c, conveyor 90 includes a continuous belt mounting spaced upstanding element 92 for displacing the skewered meat toward a second conveyor pickup station, generally indicated at 94. The second conveyor comprises a pair of endless belts 96, preferably formed of a polyurethane rubber or other suitable material, for carrying the skewered meat through subsequent cooking stages. Particularly, belts 96 extend through a yoke 98 which adapts the belts for picking up the skewered meat slices and holding and conveying the same through the cooking stage. Referring to FIG. 8, belts 96 are generally channel-shaped. Yoke 98 is also generally channel-shaped and includes an enlarged cavity 100 within the base of the yoke. As illustrated in FIG. 3a, the ends of the skewer sticks 42 project beyond the lateral edges of conveyor 90. Belts 96, by means of suitable roller placement, are brought into close juxtaposition one with the other and with one overlying the other for purposes of gripping the free end of the skewer sticks 42. Once the skewer sticks are caught between the horizontally disposed belts 96, the belts enter yoke 98 and are rotated or twisted 90 degrees such that the skewered meat slices depend vertically from the belt along the open side of the yoke. The yoke also maintains the belts 96 in close juxtaposition whereby the frictional engagement between the belts 96 and the skewer sticks is maintained.

The skewered meat slices are then conveyed through a sauce bath for marinating the meat. This is accomplished by lowering yoke 98 over a container 102 containing a sauce such that the skewered meat slices are dipped into and carried through the sauce in container 102. Upon emergence of the skewered meat slices from the sauce bath, they are conveyed through a dryer 104 and then through an oil bath 106. Upon emergence from oil bath 106, yoke 98 is twisted as at 107 such that one belt 96 overlies the other belt 96 thereby to reorient the skewered meat slices from their previously depending vertical position illustrated in FIG. 2a to a generally horizontally disposed position for transfer to a third conveyor 108. Conveyor 108 comprises an endless belt which extends through an oven 110, preferably of the microwave type, for fast cooking of the skewered meat lices. The length of the oven and the speed of conveyor 108 are such that the skewered meat slices are given sufficient time to cook during their passage through the oven. From the oven, the skewered meat slices are conveyed through a cooler 112 and, when cooled, are then ready for packaging.

The packaging assemblage is illustrated schematically at the right hand side of FIG. 2b and in FIG. 2c. The cooked skewered meat slices, which extend transversely along conveyor 108, are deposited from conveyor 108 onto a packaging sheet, preferably a polyethylene sheet 114, which, in turn, is carrried on a conveyor 116 over a plurality of rollers 118. The packaging sheet 114 is provided from a supply roll 120. The packaging sheet 114 serves as the bottom side of the finished package. It will be appreciated that the skewered meat slices are deposited on packaging sheet 114 in longitudinally spaced intervals and that the slices must be grouped in predetermined numbers for enclosure in each of the packages. This is accomplished at a meat grouping and sauce packaging station, generally indicated at 121. This station includes a vertically reciprocable gate 122 which operates in conjunction with a sauce package dispenser 124. Particularly, the skewered meat slices are grouped by lowering the gate 122 to stop the movement of the slices relative to the continuously moving packaging sheet 114 until the predetermined number of meat slices are accumulated. For example, four or five skewered meat slices may be accumulated behind the lowered gate 122. Also, when gate 122 is lowered, dispenser 124 drops a previously prepared package containing sauce for the skewered meat slices. The sauce packages, for example, may contain in dehydrated form, crushed peanuts mixed with spices and sometimes pineapple cubes. In this form, the dehydrated sauce need only be mixed with water to serve. Gate 122 is then raised after the predetermined number of skewered meat slices have accumulated whereby this group of meat slices, together with the sauce package, are further conveyed along conveyor 116 on the lower package sheet 114. An upper packaging sheet 126 is continuously conveyed from a supply roll 128 along the underside of a conveyor 130. Consequently, the groups of skewered meat slices and sauce packages toward the right hand end of the conveyor 130 as illustrated in FIG. 2c are disposed or sandwiched between the upper and lower packaging sheets 126 and 114, respectively.

At the end of conveyor 130 and on conveyor 116, there is provided a sealing and cutting machine, generally indicated at 131. With reference to FIG. 9, sealing and cutting machine 131 includes a pair of rollers 132 along opposite edges of belt 116. Connecting the rollers 132 is a transversely extending cutter blade 134 and a pair of heat sealing elements 136. Rollers 132 also carry heat sealers about their periphery whereby the lateral edges of each of the upper and lower packaging sheets are sealed one to the other. It will be appreciated that, as rollers 132 rotate, heat sealers 136 and cutting blade 134 respectively seal the upper and lower packaging sheets one to the other transversely across conveyor 116 with the cutter 134 severing the packaging sheets between the pairs of transverse seals. The cutting and sealing rollers are, of course, adjusted such that the cutter 134 and adjacent sealers 136 land midway between adjacent groups of skewered meat slices and sauce packages for each revolution. Consequently, when the skewered meat products and sauce packages emerge from the cutting and sealing station, there is provided a plurality of sealed packages each separated from the next and each containing the skewered meat slices and sauce package. The packaging sheets are preprinted with brand and other relevant information identifying the meat product. The packages are thus ready for packing in large containers for delivery.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An automated method of preparing skewered meat products comprising the steps of: slicing the meat product into strips, locating the strips sequentially between a pair of press platens having corresponding and opposing sinuous configurations, moving one of the platens toward the other platen in a direction such that the platens lie in planes substantially parallel to one another throughout the range of movement of the one platen toward the other platen to press each meat strip therebetween whereby each strip obtains a like sinuous configuration as the platens, passing a skewer through each meat strip while the strip is pressed between the platens whereby each meat strip is pierced at longitudinally spaced positions therealong, removing one of the platens away from the other platen, displacing each skewered meat strip in the direction of the platen being removed, thereafter displacing each skewered meat strip from the other of said platens onto a conveyor, conveying the skewered meat strips through a sauce bath, cooking the skewered meat strips in an oven, accumulating the skewered meat strips in groups thereof with each group containing a plurality of the skewered meat strips, and packaging each group of cooked skewered meat strips.

2. The method according to claim 1 including the step of vertically positioning the skewered meat strips during conveyance thereof through the sauce bath, the step of conveying the strips through the sauce bath being accomplished with the strips depending from the conveyor into the sauce bath.

3. The method according to claim 1 wherein the step of packaging includes disposing the strips on a sheet of meat packaging material, and sealing a second sheet of meat packaging material peripherally about each group of meat strips located between said sheets of packaging material to form a package of cooked, skewered meat products.

References Cited
UNITED STATES PATENTS

| | | | |
|---|---|---|---|
| 2,815,530 | 12/1957 | Alexander | 99—107 X |
| 2,859,685 | 11/1958 | Alexander | 99—107 X |
| 3,635,732 | 1/1972 | Bissett | 99—107 |

HYMAN LORD, Primary Examiner

U.S. Cl. X.R.

426—382, 392, 523

PO-1050
(5/69)

UNITED STATES PATENT OFFICE
CERTIFICATE OF CORRECTION

Patent No. 3,804,955        Dated April 16, 1974

Inventor(s) Philip Y. Chow

It is certified that error appears in the above-identified patent and that said Letters Patent are hereby corrected as shown below:

Column 1, line 53, "corrugarted" should read --corrugated--.

Column 3, line 37, "arcurately" should read --arcuately--.

Column 4, line 62, "68" should read --lever 68--.

Column 5, line 65, "stage" should read --stages--.

Column 6, line 21, "lices" should read --slices--.

Signed and sealed this 10th day of September 1974.

(SEAL)
Attest:

McCOY M. GIBSON, JR.
Attesting Officer

C. MARSHALL DANN
Commissioner of Patents